United States Patent [19]

Petrosky

[11] 4,110,725
[45] Aug. 29, 1978

[54] SEQUENTIAL TONE ACOUSTIC COMMAND LINK

[75] Inventor: Kenneth J. Petrosky, Glen Burnie, Md.

[73] Assignee: Westinghouse Electric Corp., Pittsburgh, Pa.

[21] Appl. No.: 787,633

[22] Filed: Apr. 14, 1977

[51] Int. Cl.² .................. H04B 11/00; H04Q 9/02
[52] U.S. Cl. ........................... 340/5 R; 340/16 C; 340/148; 340/171 A; 325/419; 325/420
[58] Field of Search ............ 340/5 R, 16 C, 148, 340/171 A, 171 PF; 325/346, 419, 420, 422

[56] References Cited
U.S. PATENT DOCUMENTS

| 3,701,103 | 10/1972 | Padgett et al. | 340/148 X |
| 3,939,465 | 2/1976 | Helton et al. | 340/5 R |
| 4,001,772 | 1/1977 | Powell et al. | 340/171 PF |

Primary Examiner—Richard A. Farley
Attorney, Agent, or Firm—D. Schron

[57] ABSTRACT

An acoustic multi-tone code signal is transmitted through a water environment to a receiver unit which includes a multi-tone code decoder. If the signal-to-noise ratio of the input signal is above a certain threshold, only then will the coded signal be passed on to the decoder which will provide an output control signal in accordance with the particular code.

9 Claims, 11 Drawing Figures

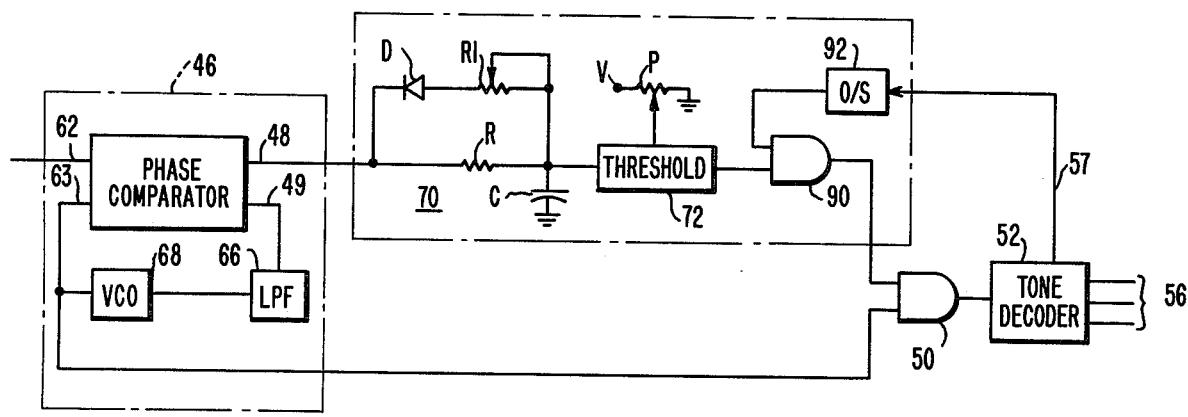
FIG. 7
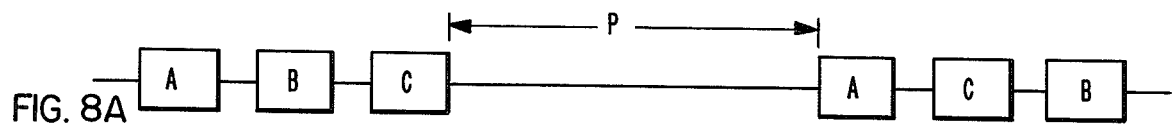
FIG. 8A
FIG. 8B
FIG. 9
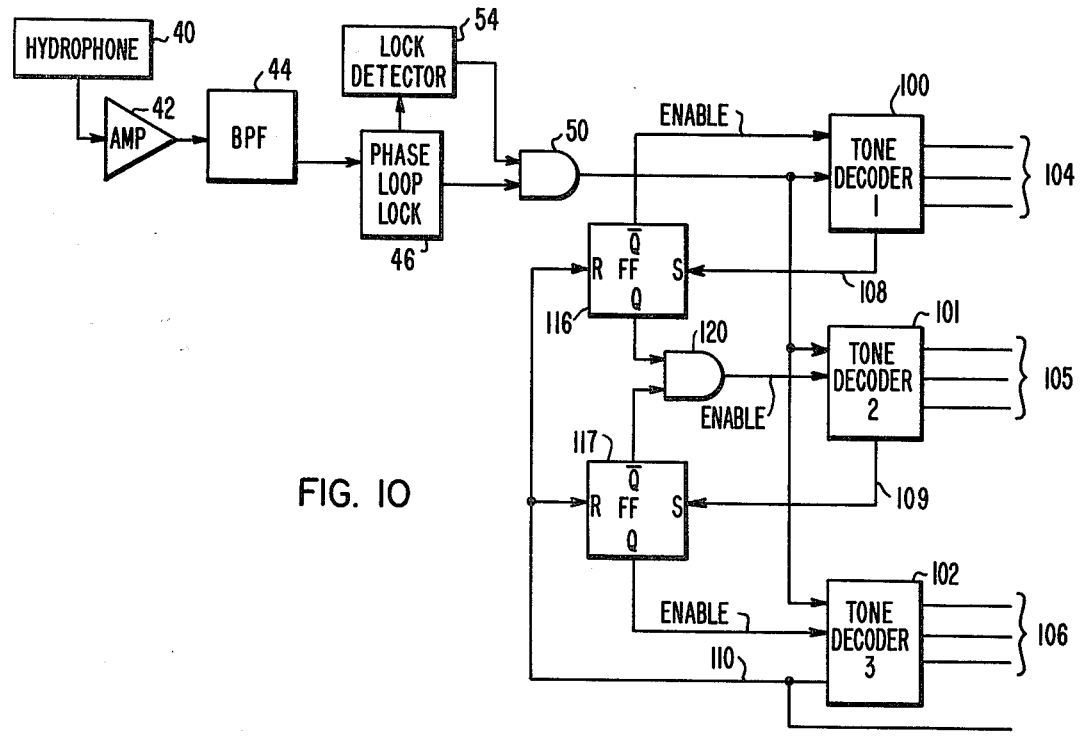
FIG. 10

SEQUENTIAL TONE ACOUSTIC COMMAND LINK

The invention herein described was made in the course of or under a contract or subcontract thereunder, with the Department of the Navy.

BACKGROUND OF THE INVENTION

1. Field of the Invention

The invention in general relates to remote, acoustically controlled systems and particularly to a receiver for such systems.

2. Description of the Prior Art

The need often arises for the remote control of underwater systems wherein command signals are transmitted acoustically through the water environment, as opposed to a hard wire transmission link. Many systems utilize multi-tone sequential code signaling techniques wherein different combinations of coded groups represent different commands to be carried out by the system. The receiver portion of the system includes a decoder which decodes the different combinations of input codes and provides an appropriate binary coded output for the various control functions.

With a hard wire link, the arrangement works with few, if any, false alarms. However, when the command link is accomplished acoustically through the water, problems arise with respect to, for example, sea state noise interference, multi-path interference, and various engine and mechanical noises present, thus causing a relatively high and objectionable false alarm rate.

To eliminate triggering on false signals, circuits have been constructed incorporating filter banks and threshold logic whereby only certain signals in a particular frequency range and with an amplitude above a certain preset threshold will be utilized in the decoding process. With such an arrangement the false alarm rate is reduced slightly, however various random noises, if above the threshold level, are interpreted as command signals.

Another arrangement which provides highly satisfactory operation utilizes a sophisticated computer for analyzing the incoming signal and supplying the appropriate command signals to the system under control. For many underwater systems, however, size and space requirements are restricted and computer interface requirements are severe.

The receiver of the present invention is a relatively low cost, small sized receiver which will provide the necessary control signals to the remote system with a very low rate of false alarms.

SUMMARY OF THE INVENTION

The receiver portion includes a transducer means which is responsive to the acoustically transmitted multi-tone code signal for providing a corresponding electrical multi-tone code signal serving as an input signal. A phase lock loop circuit is provided and includes a voltage controlled oscillator (VCO) and a phase comparator which receives not only the input signal but the output signal of the VCO. The phase comparator provides at least two output signals one being a control signal for governing the frequency of the VCO and another, a phase output signal indicative of the degree of lock between the input signal and the VCO output signal with the degree of lock being indicative of the signal-to-noise (S/N) ratio of the input signal. A gating circuit, when enabled, is operable to pass the VCO output signal and a lock detector circuit will enable the gating circuit when the S/N ratio is above a predetermined level. A multi-tone code decoder is responsive to the passed VCO output signal for providing control signals in accordance with the transmitted code signal to thereby govern certain operations of the remote underwater system.

BRIEF DESCRIPTION OF THE DRAWINGS

FIG. 7 is similar to FIG. 5 for use in high reverberation sites;

FIGS. 8A and 8B are waveforms illustrating the operation of the additional feature of FIG. 7;

FIG. 9 illustrates a multi-group, multi-tone signal; and

FIG. 10 is a block diagram of the circuitry for detecting and decoding the signal groups of FIG. 9.

DESCRIPTION OF THE PREFERRED EMBODIMENT

Figure 1:
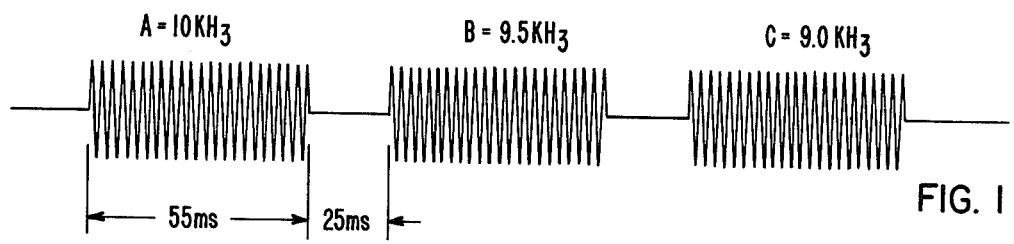
FIG. 1 illustrates a typical three-tone sequential code.

FIG. 1 illustrates an example of a multi-tone group code, the example chosen having three tones with the frequencies used and their order of transmission determining the code value. For example, the first tone, A, may have a frequency of 10 kHz, the second tone, B, 9.5 kHz and the third tone, C, 9.0 kHz. Each tone may last for a duration of 55 milliseconds with a 25 millisecond delay between alternate tones. Different combinations of A, B and C may represent different commands, however, consecutive tones in each group code must be of different frequency.

Figure 2:
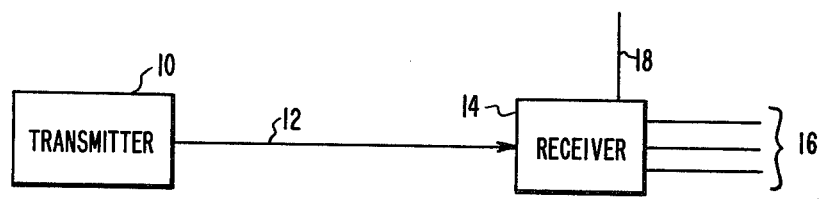
FIG. 2 is a block diagram of a typical prior art hard wire transmission link.

FIG. 2 illustrates a typical command link wherein a transmitter 10, in response to an operator or computer input will generate a multi-tone signal and transmit it along hard wire link 12 to receiver unit 14. This unit includes a decoder which will decode eight different input codes, all based on sequential permutations of the three programmed frequencies of FIG. 1, to provide an appropriate binary coded output on output leads 16. For every programmed group received, including repetitive codes, a pulse appears at the code received output lead 18.

Figure 3:
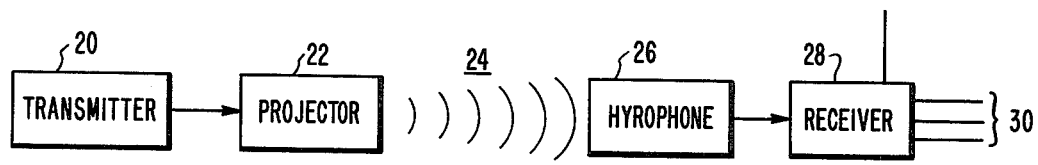
FIG. 3 is a block diagram illustrating an acoustic command link.

The binary coded output at leads 16 may be utilized to control the various operations in a system remote from the transmitter. For some operations a remote system to be controlled may be located in an underwater environment wherein commands are to be transmitted acoustically through the water. For such arrangement, and as illustrated in FIG. 3, the commands provided by transmitter 20 are converted to corresponding acoustic signals by means of projector 22 and after transmission through the water environment 24 are picked up by a transducer in the form of hydrophone 26. After conversion back to an electrical signal, the code group is provided to receiver unit 28 for proper decoding and provision of output signals. From an acoustic standpoint, the water environment is very noisy and includes spurious signals in the frequency range being utilized. This coupled with other interference such as multi-path interference and sea state noise contribute to erroneous command output signals being provided on output leads 30.

Figure 4:
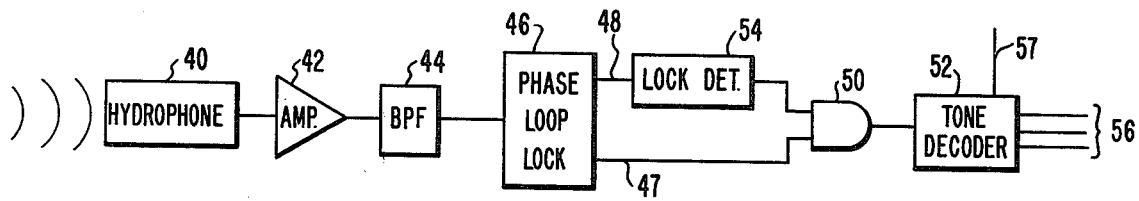
FIG. 4 is a block diagram of the preferred embodiment of the present invention.

In FIG. 4 there is illustrated an embodiment of the present invention which provides for the detection of acoustically transmitted code groups with a low false alarm rate so that erroneous controls are not provided. FIG. 4 illustrates a receiver system including a hydrophone 40 which is responsive to the acoustically transmitted mutli-tone code signal to provide a corresponding electrical multi-tone code input signal. The input signal is amplified in amplifier 42 and provided to a band pass filter 44 which passes only the frequency range of interest.

Phase lock loop 46 includes a phase comparator and a voltage controlled oscillator and produces two output signals, one on line 47 being VCO output signal and another on line 48 being a phase output signal indicative of the degree of lock between the input signal and the VCO output signal with this degree of lock being indicative of the S/N ratio of the input signal.

The VCO output signal, when in lock, is the same as the input signal and is provided to a gate circuit 50 which when enabled will pass the VCO output signal to tone decoder 52. In the present invention gate circuit 50 will be enabled only when the S/N ratio of the input signal is above a predetermined level and this determination is made by lock detector circuit 54. When the S/N ratio is above the predetermined threshold, the VCO output signal, which is in essence a reproduction of the input signal, is passed through to tone detector 52 which will then provide control signals on output leads 56 in accordance with the code signal. As was the case with respect to FIG. 2, a code received output signal will be provided on lead 57. Tone decoders which receive different input codes and provide an appropriate binary coded output together with a code received pulse are well known to those skilled in the art and an example of a tone decoder which will perform the functions herein described is a product of Consumer Microcircuits of America, Inc. Model FX-307 multi-code receiver.

Figure 5:
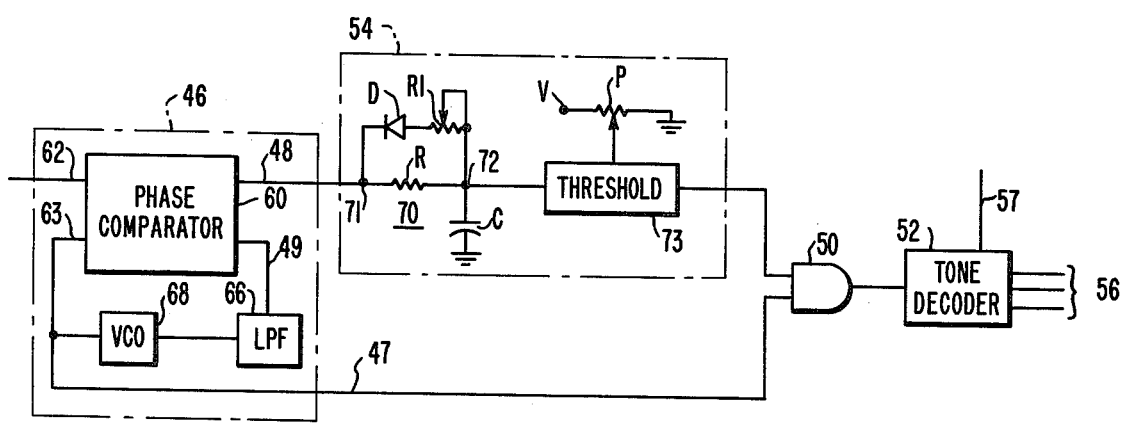
FIG. 5 is a block diagram illustrating components of FIG. 4 in more detail.

FIG. 5 illustrates the phase lock loop 46 and lock detector 54 of FIG. 4 in somewhat more detail. Phase lock loop 46 includes a phase comparator 60 having two input leads 62 and 63 and two output leads 48 and 49. The phase output signal is provided on lead 48 while a VCO control signal is provided on lead 49 which signal, after filtering in low pass filter 66, is utilized to control the frequency of VCO 68. The output signal of VCO 68 is provided to gate circuit 50 as well as to the second input of phase comparator 60, the first input of which receives the input signal.

In operation, the output of low pass filter 66 is adjusted until the input signal and the VCO signal are equal in both phase and frequency. When this occurs the phase output signal on output lead 48 is at a high level and can be utilized for indicating a locked condition. Such phase locked loops are well known to those skilled in the art and one such circuit is manufactured in integrated circuit form by RCA and is designated CD4046.

The phase output signal, indicative of the degree of lock and the S/N ratio of the input signal, is filtered in a low pass filter 70 which includes resistor R between first and second circuit points 71 and 72 and capacitor C connected between said second circuit point 72 and a reference potential such as ground. In addition, a series arrangement of adjustable resistor R1 and diode D is connected in parallel with resistor R. With this arrangement the response time in a forward direction is determined by the values of R and C whereas the response time in the reverse direction is determined by the value of R and R1 in parallel combination with C. By proper choice of resistors the response time in the reverse direction can be made much faster than that in the forward direction thus allowing quick recognition of the phase lock loop dropping out of lock.

If the output of low pass filter 70 is above a certain threshold level, indicating a relatively high S/N ratio, then gating circuit 50 will be enabled to pass the VCO output on to tone decoder 52. Accordingly a threshold circuit 73 is provided to accomplish this thresholding determination, and if desired, the threshold level may be varied with the provision of potentiometer P connected to a suitable source of voltage V.

Figure 6:
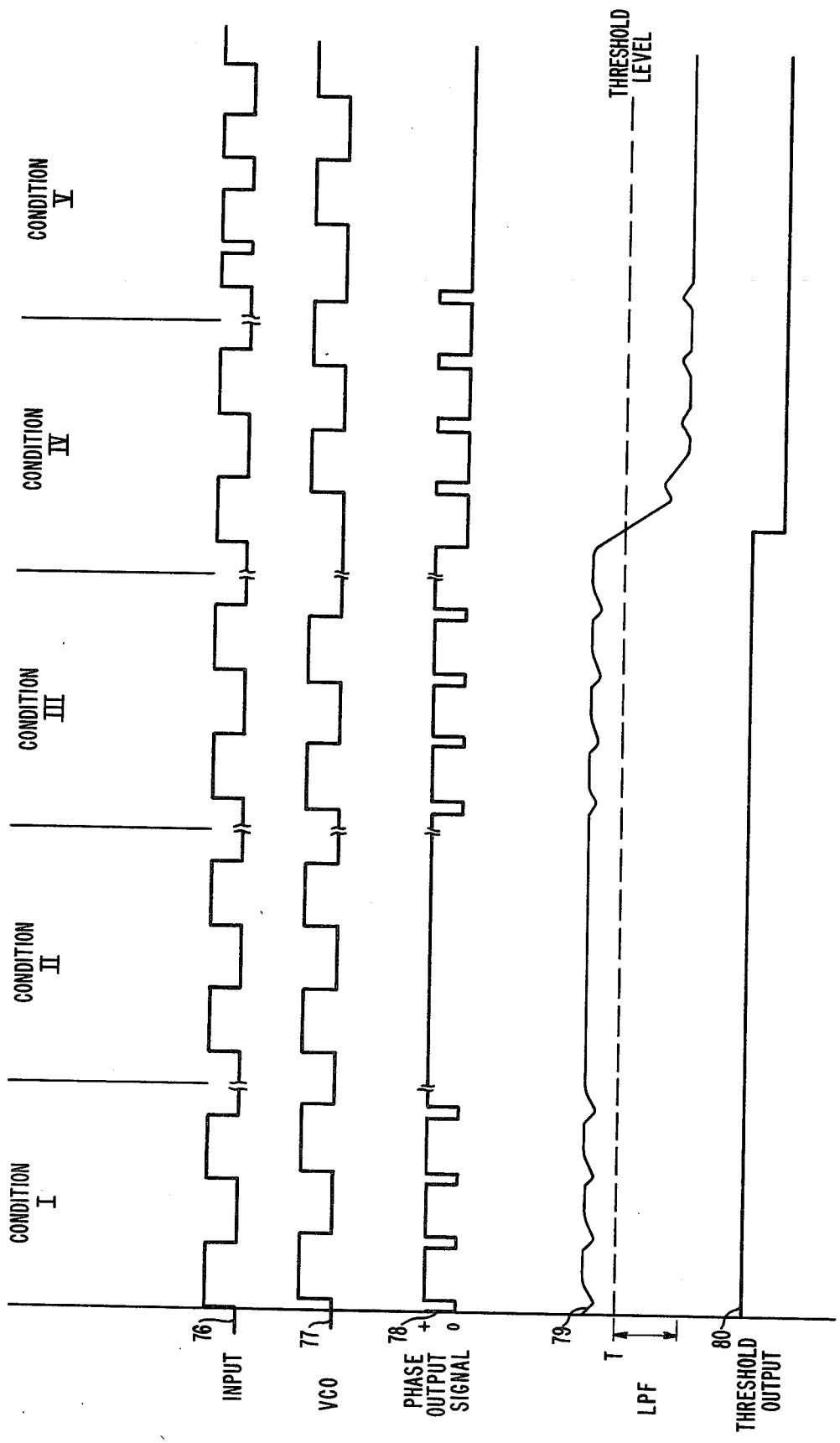
FIG. 6 are curves to aid in the understanding of the operation of the circuitry of FIG. 5.

The operation of the circuitry of FIG. 5 may best be explained with additional reference to FIG. 6 illustrating various waveforms for five different conditions, condition I depicting the input signal slightly leading the VCO signal in phase, condition II depicting an exact lock, condition III depicting the VCO leading the input signal slightly, condition IV depicting the transition to an out-of-lock situation and condition V depicting a completely out-of-lock situation. Waveform 76 represents the input signal (after amplitude limiting) and this signal in condition I slightly leads the VCO output signal as represented by waveform 77. Since these two signals are just slightly out of lock, the phase output signal, as represented by waveform 78 has a relatively high duty cycle, remaining at a high level over most of condition I. The percentage of duty cycle is proportional to the degree of lock and to the S/N ratio.

When the input and VCO signal 77 are exactly in lock as in condition II, phase output signal 78 remains at a constant high level and for condition III where the VCO output leads the input signal the phase output signal is similar to that of condition I.

In going from condition III to condition IV, it is seen that the VCO and input signals become grossly out of lock such as to result in an extremely low duty cycle for the phase output signal and when the VCO and input signals are completely out of lock, as in condition V, no appreciable phase output signal is provided.

As long as the S/N ratio is above a predetermined level, the VCO output signal is gated through to the decoder for normal operation. Since the duty cycle of waveform 78 is indicative of the S/N ratio, waveform 78 is filtered by low pass filter 70 resulting in waveform 79 which, as long as it is above a threshold level T, will result in threshold circuit 73 providing an output enabling signal as indicated by waveform 80.

For conditions I, II and III waveform 79 remains above the threshold level T. However, when phase output signal 78 reverts to a low condition, waveform 79 discharges at a relatively rapid rate whereas when phase output signal 78 reverts to its high condition waveform 79 will charge up to a certain level, but at a slower rate than the discharge. It is seen however that even with the rapid discharge, the level of waveform 79 does not dip below threshold T. In condition IV however an out-of-lock situation occurs whereby the rapid discharge rate takes waveform 79 below threshold T where it remains for the rest of condition IV and condition V. When a predetermined in-lock condition next occurs, waveform 79 will rise above the threshold level indicating an acceptable S/N ratio and an enabling signal will be provided to gate the VCO output signal to the tone decoder. If an out-of-lock condition subsequently occurs, the enabling signal to gating circuit 50 will be quickly removed.

FIG. 7 illustrates the circuitry of FIG. 5 with an additional feature. If the apparatus is used in a location where the possibility of multiple reflections is present, the same group code could possibly be decoded twice in succession, once from the direct path and next from a reflected path. For example, with additional reference to FIG. 8A, a first code group, A B C, is subsequently followed by a second code group A C B. During the time interval between the two code groups, there is a possibility that the first code group A B C will be reflected and again received during the period P. In order to prevent this objectionable operation, the circuitry of FIG. 7 includes an additional gating circuit 90 operable to gate the enabling signal from threshold circuit 72 to gating circuit 50 only when it itself receives an enabling signal. The enabling signal for gating circuit 90 is normally provided by, for example, a one-shot multivibrator 92 which when triggered, will remove the enabling signal for a predetermined period of time. Since a code received output signal is provided on lead 57 this may be utilized to trigger the one-shot multivibrator 92 and as illustrated in FIG. 8B after the first code group A B C is received, an enabling signal is no longer provided so that subsequent reflected signals will not pass through to tone decoder 52. One-shot multivibrator 92 may be adjusted such that the enabling signal will again be provided prior to the receipt of the next code group.

Expansion of the basic system can easily be achieved to accomplish decoding of a multi-group multi-tone code signal as for example illustrated in FIG. 9 which shows a first code group A B C, a second code group B C A and a third code group A C B. For such arrangement three-tone decoders will be utilized as illustrated in FIG. 10. The front end of the system from the hydrophone 40 to the gating circuit 50 is identical to that described in FIG. 4 and those components have been given the same reference numerals.

Three-tone decoders 100, 101 and 102 are utilized, with each including respective output leads 104, 105 and 106 and each being operable to provide a code received output signal on respective leads 108, 109 and 110. All of the tone decoders are connected to receive the same signal provided by gating circuit 50 however only that tone decoder which is provided with an enabling signal will be operational. The enabling circuitry for the tone decoders includes flip-flops 116 and 117 in conjunction with gating circuit 120.

With flip-flops 116 and 117 in their reset condition the Q outputs are logic ones while the $\bar{Q}$ outputs are logic zeros. The logic one output from flip-flop 116 enables tone decoder 100 whereas the zero output from flip-flop 117 maintains tone decoder 102 in an inoperative condition. Gate circuit 120 receiving a zero input from flip-flop 116 and a one input from flip-flop 117 does not provide an enabling signal to tone decoder 101.

After the A B C group (FIG. 9) is decoded in tone decoder 100 the code received output pulse on line 108 places flip-flop 116 into a set condition such that the $\bar{Q}$ output no longer enables tone decoder 100 and the Q output causes gate circuit 120 to provide an enabling signal to tone decoder 101, which after decoding of the second or B C A group will provide a code received output signal on line 109 to set flip-flop 117. The setting of flip-flop 117 removes the enabling signal from tone decoder 101 and the Q output enables tone decoder 102 to operate upon the third group A C B, after which the code received output signal on line 110 resets both flip-flops 116 and 117.

Thus, by utilizing the multi-group multi-tone arrangement as in FIG. 9 a greater number of operations may be remotely controlled. If each three-bit output from the tone decoders represents eight different controls, then a total of 3 × 8 or 24 controls may be achieved with the circuit of FIG. 10. Alternatively, if the outputs from all of the tone decoders are considered as a nine-bit output, then a total combination of $2^9$ or 512 controls are possible.

What I claim is:

1. A receiver for an acoustic transmission system wherein a multi-tone code signal is acoustically transmitted, comprising:
   (A) transducer means responsive to said acoustically transmitted multi-tone code signal for providing a corresponding electrical multi-tone code input signal;
   (B) a phase lock loop circuit including a VCO and a phase comparator adapted to receive said input signal and the output signal of said VCO;
   (C) said phase comparator being of the type to provide, in response to its two input signals,
      (i) an output control signal for governing the frequency of said VCO output signal, and
      (ii) a phase output signal indicative of the degree of lock between said input signal and said VCO output signal, said degree of lock being indicative of the signal-to-noise ratio of said input signal;
   (D) gating means operable, when enabled, to pass said VCO output signal;
   (E) means for enabling said gating means when said signal-to-noise ratio is above a predetermined level; and
   (F) a multi-tone code decoder responsive to said passed output signal for providing control signals in accordance with said code signal.

2. Apparatus according to claim 1 wherein said means for enabling includes:
   (A) a filter network adapted to receive, and low pass filter said phase output signal; and
   (B) a threshold circuit responsive to said filtered phase output signal and operable to provide an enabling signal to said gating means when said filtered phase output signal is above a certain threshold level.

3. Apparatus according to claim 2 wherein;
   (A) said threshold level is adjustable.

4. Apparatus according to claim 2 wherein:
   (A) said filter network has a first response time to current passing therethrough in a first direction and a second response time to current passing therethrough in a second and opposite direction.

5. Apparatus according to claim 4 wherein:
   (A) said second response time is faster than said first response time.

6. Apparatus according to claim 2 wherein said filter network includes:
   (A) first and second circuit points;
   (B) a first resistance connected between said circuit points;

(C) a capacitor connected between said second circuit point and a reference potential; and (D) a series arrangement of a second resistance and a diode connected between said circuit points in parallel with said first resistance.

7. Apparatus according to claim 1 which includes:

(A) a multi-tone code decoder of the type which provides a code received output signal after receipt of said multi-tone code signal; and (B) means for preventing further decoding by said multi-tone code decoder until a predetermined time duration after provision of said code received signal.

8. Apparatus according to claim 1 wherein a multi-group multi-tone code signal is transmitted and which includes:

(A) a plurality of said multi-tone code decoders each operable to function upon provision of an enabling signal and each being operable to provide a code received output signal after receipt of a multi-tone code signal; and (B) enabling circuitry for sequentially enabling said plurality of multi-tone code decoders so that each may decode one code signal of said group.

9. Apparatus according to claim 8 wherein three multi-tone code decoders are provided and wherein said enabling circuitry includes:

(A) first and second flip-flop devices each operable in a set and reset state of operation;

(B) a gate circuit;

(C) said first flip-flop, when in said reset state, being operable to enable a first of said decoders;

(D) said first flip-flop being responsive to a code receive output signal from said first decoder to be placed into said set state;

(E) said gating circuit being responsive to the set state of said first flip flop and the reset state of said second flip-flop to provide an enabling signal to a second of said decoders;

(F) said second flip-flop being responsive to a code received output signal from said second decoder to be placed into said set state;

(G) said second flip-flop, when in said second state being operable to enable the third of said decoders;

(H) said first and second flip-flops being responsive to a code received output signal from said third decoder to be placed into said reset state, whereby said first decoder is again enabled.

* * * * *